Feb. 4, 1936.  F. W. SPERR, JR  2,029,343
MULCH AND METHOD OF USING THE SAME
Filed April 12, 1933  2 Sheets-Sheet 1
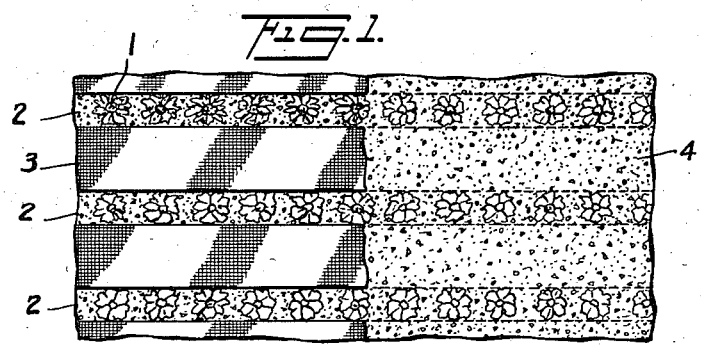
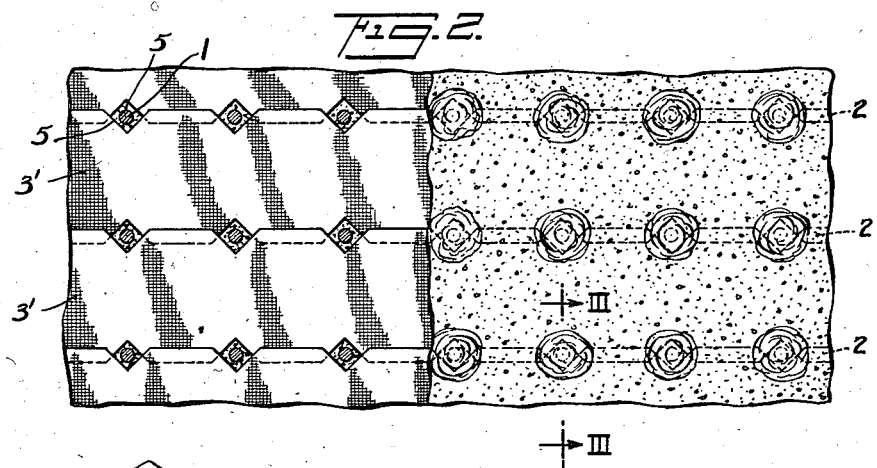
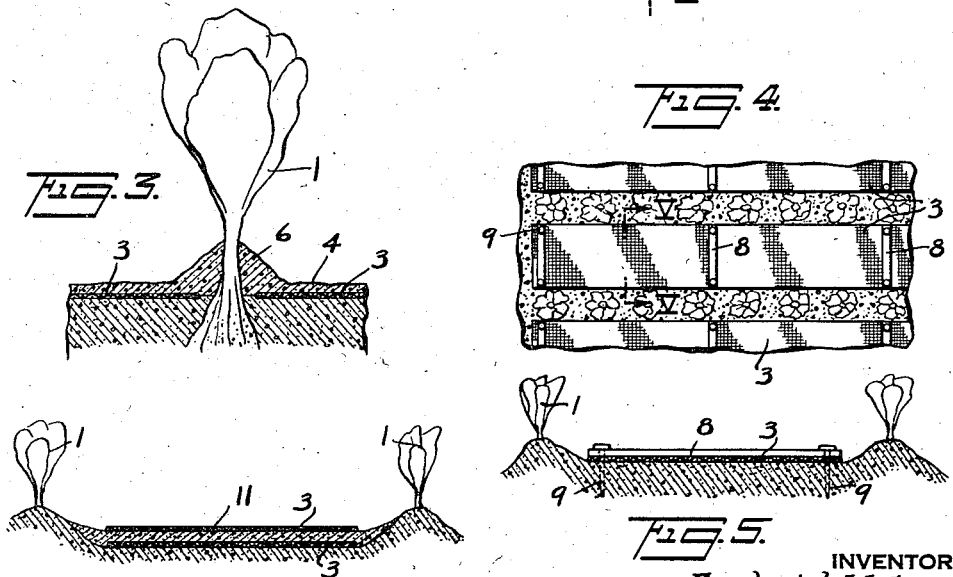
INVENTOR
Frederick W. Sperr, Jr.
BY
ATTORNEY

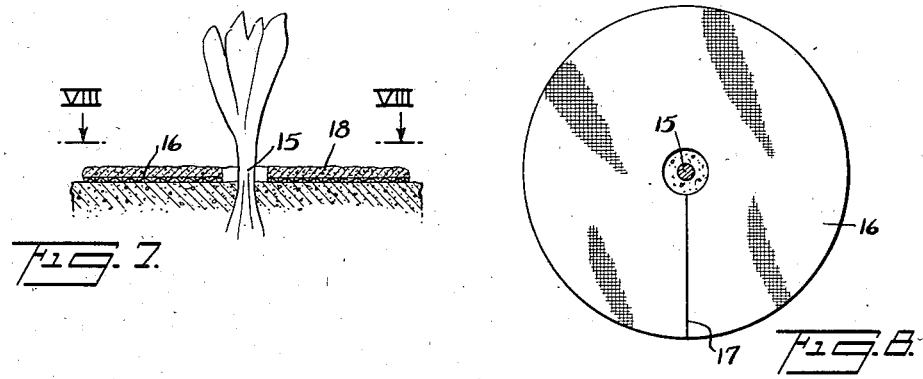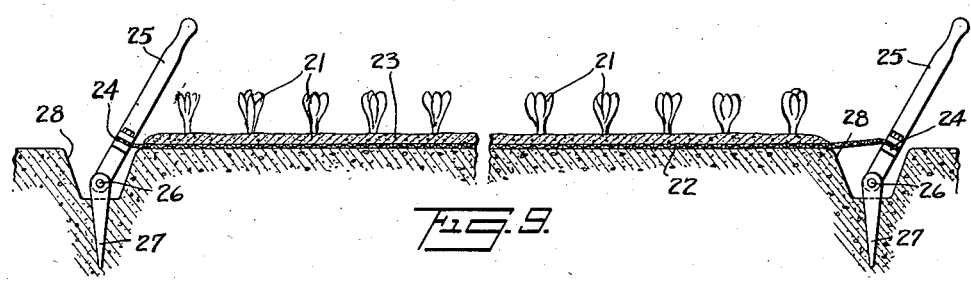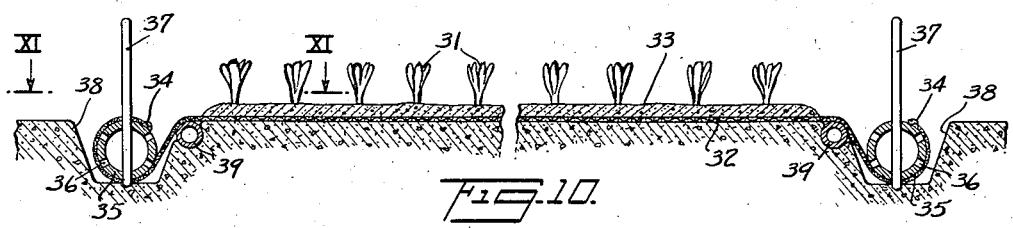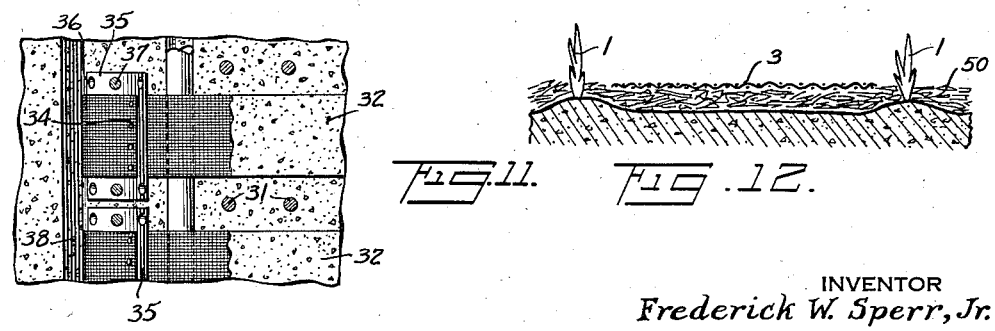

Patented Feb. 4, 1936

2,029,343

UNITED STATES PATENT OFFICE 2,029,343

MULCH AND METHOD OF USING THE SAME

Frederick W. Sperr, Jr., Vineland, N. J., assignor of one-fourth to Horace B. Cooke, Greenwich, Conn.

Application April 12, 1933, Serial No. 665,695

6 Claims. (Cl. 47—9)

This invention relates to the mulching of plants, that is to say, to the covering and protection of the soil lying between plants, more particularly vegetables, flowering and other valuable plants grown in intensive gardening operations.

In the commercial raising of vegetables, flowers, and other plants, a considerable amount of labor is ordinarily required to cultivate the ground around the plants, for the purpose of checking the growth of weeds and maintaining the soil in a condition favorable to the proper growth of the plants. Cultivation is resorted to for the purpose of providing an insulating layer of loosened earth which inhibits rapid temperature changes, keeps the soil uniformly warm, promotes aeration of the plant roots, retards the escape of moisture from the soil, and during the periods of rainfall distributes the moisture uniformly instead of irregularly around the plants, thus avoiding the irregular and unequal distribution of moisture which occurs when the ground is hard and uncultivated.

The expedient of mulching is resorted to for reducing the cost and labor for cultivation. The purpose of a mulch is to provide a covering over the ground around and between the plants, to inhibit the growth of weeds and also to assist in the maintenance of proper conditions of moisture and temperature in the soil and plants.

Various types of mulches have been proposed, the best known consisting of strips of so-called "mulch paper" which ordinarily consist of strips of heavy paper which may or may not be coated with asphalt or other bituminous material, these strips being laid between the rows of plants. Mulch paper has been used commercially to some extent but its use has not become widespread because of several serious disadvantages to which it is subject.

In the first place the strips of mulch paper tend to become warped, the coating of the paper becomes oxidized, and by the end of a single growing season the quality and condition of the material are ordinarily so deteriorated that it cannot possibly be used again. Consequently, new mulch paper must be applied every season, while the used mulch paper from the previous season is of no practical value and its disposal constitutes a nuisance and expense.

Moreover, if the strips of mulch paper are unperforated, as is usually the case, the distribution of moisture falling upon the ground during rainfall is caused to be exceedingly irregular and injurious. It has been proposed to employ a mulch paper which has been provided with perforations for the purpose of overcoming this difficulty, but this proposal has not resulted in an effective solution of the problem for the reason that the provision of any adequate number of perforations seriously weakens the material. On the other hand, reducing the number of perforations simply reintroduces the problem of moisture distribution and this problem is increased by the warping of the paper which inevitably occurs. The perforations in the mulch paper also tend to become clogged by leaves, pebbles, and other débris at least to such an extent that during a moderate or heavy downpour of rain many of the perforations fail to function.

It has also been proposed to cover the soil between the plants with bituminous material such as melted asphalt, pitch or the like which is simply poured or sprayed over the ground in a liquid condition and allowed to solidify in a thin covering layer. It will be obvious that a mulch of this character must be removed at the end of the growing season, which entails considerable expense and the loss of top soil which adheres to the material. Moreover, material of this character cannot well be recovered and utilized again and its disposition involves both nuisance and expense.

All prior proposals have been subject to the further serious disadvantage that side dressings of fertilizer, which are extremely useful during a growing season, cannot effectively be employed.

It is, therefore, an object of my invention to provide a mulch which is durable and can be repeatedly used, and which is free from the disadvantages of the prior mulchings to which I have referred hereinabove.

My invention has for further objects such additional advantages and improvements in operating results as may hereinafter be found to obtain.

My invention contemplates covering the ground between or around growing plants with a mulch comprising a strip or strips of metal wire screening so laid as to cover as much as possible of the soil around the plants and between the rows of plants. While I may employ screenings made of various metals, I prefer to employ copper screening. I have found that copper screening is sufficiently strong for the purpose and that it is extremely durable under most soil conditions likely to be encountered, so that, with reasonable care, it may be rolled up at the end of the growing season and may be re-used year after year with little deterioration. The only conditions of importance where copper screening is unsuitable are those where sulphur or soluble sulphides are present in the soil or where materials which must necessarily be employed for spraying the plants contain these substances and therefore would tend to have a corrosive action upon copper.

In such instances I may employ screening made from some sulphur-resisting metal or alloy such, for example, as aluminum or an alloy of aluminum or I may employ screening coated with a suitable corrosive resistant paint or other coating. I may even employ steel screening coated with a suitable bituminous paint. Steel screening thus coated may be quickly and cheaply cleaned and recoated in the process of removing it and rolling it up at the end of each growing season in order to preserve the material in the interval of time between the growing seasons.

Ordinarily, however, as I have pointed out, I prefer to employ copper wire screening, which has the further advantage that it tends to favor a healthy plant condition due to the specific effect of copper in controlling fungus growth and arresting many plant diseases.

Ordinarily, I prefer to employ screening of not less than 8 mesh per inch, and I have employed 18 mesh copper wire "fly screen" with extremely satisfactory results. However, screening as fine as 30 mesh per inch or even finer may be employed if desired.

Two or more layers of screening may be superimposed upon each other, either with or without an intervening layer or layers of loose earth, and when this is done the screening may be of considerably coarser mesh than would otherwise be true.

I further provide various improvements in design and in methods of using the mulch which will be further described hereinbelow. In order that these and other aspects of my invention may be clearly set forth and understood, I now describe with reference to the drawings accompanying and forming a part of this specification, various preferred forms and manners in which my invention may be employed and utilized. In these drawings, Fig. 1 is a plan view of a small amount of ground in which plants are being grown, said ground being provided with a mulch in accordance with my invention;

Fig. 2 is a similar view illustrating an alternate form of mulch;

Fig. 3 is a vertical sectional view of a single growing plant, the ground around which is provided with a mulch in accordance with my invention, this view being taken along the line III—III of Fig. 2;

Fig. 4 is a view similar to Figs. 1 and 2 but illustrating means for causing the mulch to adhere more or less tightly to the ground upon which it is laid;

Fig. 5 is a vertical sectional view of a portion of the ground and the mulch shown in Fig. 4, this view being taken along the line V—V of Fig. 4;

Fig. 6 is a vertical sectional view similar to Fig. 5, but illustrating a manner in which a plurality of layers of wire screen are used as a mulch;

Figs. 7 and 8 are vertical and horizontal sectional views, respectively, of a single growing plant provided with a mulch in accordance with my invention, Fig. 8 being taken along the line VIII—VIII of Fig. 7;

Fig. 9 is a vertical sectional view of a portion of a garden provided with a mulch as described herein, and showing single means for stretching and shifting the mulching strips;

Figs. 10 and 11 are vertical and horizontal views, respectively, of a small portion of a garden provided with mulching strips in accordance with my invention, and showing an alternative form of means for stretching and shifting said strips; and Fig. 12 is a vertical sectional view of a portion of a garden provided with an alternative form of mulch.

Similar reference numbers designate similar parts in each of the several views of the drawings.

Referring now to the drawings and more particularly to Fig. 1 thereof, there are shown a number of growing plants 1 and located in a plurality of rows 2, the spacing of the plants 1 and the rows 2 in this instance being relatively small as in the case of such plants as carrots, onions and the like. Between the rows 2 the ground is covered by means of strips 3 of copper screening or the like, the width of which obviously depends upon the nature of the plants being grown and the conditions of row spacing.

It may be pointed out, however, that in employing metal screening as a mulch there is an advantage in the fact that the rows can be spaced somewhat closer together than under ordinary conditions. For example, in raising onions the rows may be spaced apart by 8 or 10 inches instead of the customary spacing of 12 to 14 inches. In this instance the strips of mulch screen may be from 1½ to 2 inches narrower than the distance between adjacent rows.

The unused mulch screen may conveniently be kept mounted upon rolls and when it is desired to employ the material as a mulch it is simply unrolled along the rows where the plants are to be grown. I have found that it is ordinarily desirable to provide the screening with some means for causing it to adhere more or less firmly to the ground. In the instance shown in Fig. 1, this result is obtained by means of shallow layers 4 of soil of sufficient thickness to hold the screen firmly against the ground.

I have found that while a certain small amount of weed growth tends to take place in soil thus employed on top of the mulching screen, this weed growth is extremely limited in extent and is of no practical consequence because the roots of the weeds cannot effectively penetrate the screen. As an additional precaution against the growth of weeds, I find that it is desirable to shift the strips of screening back and forth longitudinally from time to time for the purpose of loosening the soil and breaking up the roots of the weeds.

By this I do not mean that the screening is taken up bodily and removed to some previously uncovered area, as such a practice would entail considerable labor and would either leave considerable portions of the ground unprotected by mulch or involve inefficient use of the screening. On the contrary, I prefer only to move or shift each strip a very small distance horizontally, preferably, in a longitudinal direction. I found that this shifting of the mulch may be very rapidly and easily accomplished and that it is remarkably effective in destroying weed growth and maintaining the top soil in a loose and advantageous condition.

In the instance illustrated in Fig. 1, the strips 3 are shown as having straight edges, this being the cheapest and most convenient form for mulching plants which are closely spaced. The screening is preferably supplied in widths suitable for use under various row spacings. It is preferred to employ screening which is so woven as to provide the edges of the screening with selvedge or other reenforcement, in order to prevent fraying and to prevent injury to the edges of the screening.

However, as in Fig. 2, for mulching plants such as lettuce which require relatively wide spacing, I may employ strips 3', the edges of which are provided with suitable indentations or notches 5, and which strips 3' are preferably as wide as or a little wider than the spaces between the rows 2. It will be seen from inspection of Fig. 2 that the strips 3' are so laid that the outermost edges of adjacent strips overlap or meet, thus providing protection for the soil lying between the plants in the individual rows, while the openings provided by the coinciding notches or indentations 5 provide room for the individual plants.

In some instances it is desired to "hill-up" the individual plants, that is to say, to provide hills or mounds around the stalks of the plants. According to my invention, as illustrated in Fig. 3, the adjacent edges of the strips 3 may be set quite close to the stems or stalks of the plants. Thus a hill 6 may be formed over the closely adjacent edges of the strips 3 by reason of the fact that the screen 3 offers negligible resistance to the passage of air, moisture, and heat through the soil. My mulch is well adapted to such use, whereas prior forms of mulching could not successfully be used in this manner.

As shown in Figs. 4 and 5, the strips 3 are provided at intervals with lateral fastening members or bars 8, the ends of which are in turn provided with vertical pins or fasteners 9 for the purpose of securing them to the ground. Such bars 8 may be provided at frequent intervals along the lengths of various mulch strips in place of a covering of soil as described in connection with Figs. 1 and 2.

In the instance shown in Fig. 6, two layers of screening 3 are employed, one of these being superimposed upon the other, either with an intervening layer 11 of loose earth, as shown, or directly. This use of a plurality of layers is especially effective against weed growth. When shifting the screens, as described hereinabove, it is ordinarily necessary to shift only one of the layers.

In the instance shown in Figs. 7 and 8, a single plant 15 is provided with an annular strip 16 of copper or other wire screening which encloses the stalk, stem or trunk of the plant. The annular strip or collar 16 may be split at one or more places, as at 17, to facilitate its use, and when used may be covered with a thin layer 18 of soil. Such mulching collars may be of various shapes and sizes to suit individual conditions, as will readily be appreciated.

In the instance illustrated in Fig. 9, a row of plants 21 are mulched by means of a strip 22 of wire screening which may, as shown, be covered with a thin layer 23 of loose earth. In this instance the opposite ends of the strip 22, or a plurality thereof, are fixed by means of clamps 24 to levers 25, pivoted at 26 to stakes or posts 27 which may be imbedded in the ground in the trenches 28 located past the ends of the rows of plants 21. By means of the levers 25, the strip 22 may be stretched as tightly as desired and may also be shifted longitudinally of the rows wherever necessary in order to prevent the growth of weeds.

In the instance illustrated in Figs. 10 and 11, a plurality of rows of plants 31 are provided with a mulch comprising strips 32 of wire screening, or the like, adapted to cover the ground between the rows of plants and which may be covered, as shown with a layer 33 of loose earth. In this instance, the opposite ends of the strips 32 are fastened by suitable means 34 to rolls 35, which rolls 35 may comprise short lengths of large diameter tubing somewhat longer than the width of the strips 32. The opposite ends of the rolls 35 may be provided with a plurality of oppositely spaced openings or holes 36 through which stakes 37 may be passed in such manner as to be imbedded in the ground below the rolls 35, thus holding the latter in position and maintaining the strips 32 in a tightly stretched condition. When it is desired to shift the strips 32 laterally, this is readily accomplished by withdrawing the stakes 37 and turning them to turn the corresponding rolls 35, after which the stakes 37 may be reinserted in order to hold the strips 32 in their new positions. As in the previous instance, the rolls 35 may conveniently be placed in trenches 38 running along the ends of rows of plants 31, and the sides of the trenches 37 may be suitably reinforced, for example by means of pipes or tubes 39 over which the strips 32 are adapted to pass when fastened longitudinally with respect to the rows.

When the special form of my invention illustrated in Figs. 10 and 11 is employed, it will be obvious that the strips 32 may be supplied to the consumer or user thereof, already mounted upon suitable rolls 35, thus obviating the necessity of supplying separate rolls for this purpose. If the lengths of screening thus supplied are longer than the rows of plants in any garden in which the screening is to be employed as a mulch, it will be obvious that the excess portion of the screening may simply be allowed to remain upon one or both of the rolls 35 at the ends thereof; this excess portion being gradually reduced, or rather transferred from one roll to the other after the strip is shifted longitudinally from time to time.

As a further modification of my invention, and more particularly the form illustrated in Fig. 4, the strips 3 may be provided with suitable weights (not shown) in place of the fastening means 8, such weights being distributed along the length of the strips 3 as desired.

Although metal screening, such as I have described, is initially more expensive than most other mulching materials which have been proposed heretofore, the ultimate expense involved, due to the fact that metal screening, if handled with reasonable care may be used over and over again without deterioration, is low, and the actual cost over a period of years compares very favorably with other materials which have been proposed or used for mulching purposes, while a mulch consisting of metal screening possesses numerous advantages not possessed by other mulches.

My mulching material may be supplied and sold in the form of strips of metal screening in widths of from 6" to 18" or even up to 36", and in suitable lengths of, for example, from 20' in length up, the edges of the screening being provided with selvedge or other reinforcement.

My invention also contemplates the manufacture and use of a mulch strip of metal screening or any other mulching material, having a plurality of weights fastened or attached thereto at suitable intervals, with or without pins for fastening the same to the ground, as shown in Figs. 4 and 5. Such pins 9 may be so made as to be readily removable from, or insertible in, the weights or strips 8.

In Fig. 12, I have illustrated a modification of my invention which is of special utility with respect to the mulching of relatively widely spaced plants such, for example, as melon plants although the use of this form of my invention is not confined to any particular type of plant or to any particular spacing of plants in a garden. In this form of my invention the ground lying between the various plants is covered with a layer of more or less fibrous material, preferably organic in character. Thus, the layer 50 may comprise the so-called "salt-hay" which is a dried marsh grass found, for example, in southern New Jersey. Such material is often used as a winter mulch and may be spaded into the ground after use to enrich the organic content of the soil but has not found favor as a summer mulch due largely to the fact that it is difficult to hold in place and does not always secure the desired results.

According to my invention, however, the layer 50 of such material, or it may be straw or other loose fibrous material, is held in place and covered between the rows of plants 1 by means of an overlying strip 3 of metal wire screening which in this instance may be, and preferably is, comparatively coarse and of wide mesh, with respect to the type of wire screening described hereinabove in connection with the other forms of my invention. As in the previous instances the strips 3 may be secured to the ground in any suitable manner as, for example, by means of pins such as the pins 9 illustrated in Fig. 5, or, by means of weights.

It will be observed from Fig. 12 that, although the strips 3 lie between the rows and do not necessarily cover the spaces lying between the plants in the several rows, the layer 50, being comprised of more or less fibrous material (the individual pieces of which may be and usually are of considerable length and which, therefore, tends to form a more or less matted layer), may and preferably does extend over substantially all of the ground, including the ground lying between the rows and the ground lying between the plants in the several rows, and the strips 3 although extending between the several rows serve adequately to maintain all of the layer 50 in place.

A mulch of the character illustrated in Fig. 12 will be found of special advantage in connection with the raising of such produce as melons for the reason that it serves to keep the melon or other fruit from contact with the ground and thus to prevent or decrease decay of the fruit which would result from contact with the fruit and the ground for an extended period. However, as stated hereinabove, this form of mulch may be employed with good results in growing many types of plants.

My invention makes it possible to practically eliminate the labor and expense of cultivation of the soil lying between the plants. Rainfall moisture is uniformly and effectively distributed and the presence of the mulch, especially when it is covered with a shallow layer of loose soil, provides a certain amount of insulation for the soil between the plants.

Weed growth is very effectively controlled and the injurious activities of many burrowing insects are checked instead of providing conditions favoring the activity of such insects, as is true of impervious materials. Side dressings of fertilizer may be made at any time during the growing season without destroying the mulch and with practically as much effectiveness as would be true if no mulch were present.

My invention has the further advantage that no disposition of the mulch at the end of the season is required, the screening being capable of employment year after year. However, where it is no longer desired to use it as a mulch, it may be sold at a high scrap value and thus a considerable portion of the original cost may be recovered.

It will be obvious that my invention is not limited to the specific details of the illustrative instances described and set forth hereinabove by way of example but may variously be employed within the scope of the claims hereinafter made.

I claim as my invention:

1. The method of mulching growing plants which comprises covering the ground adjacent to the plants with metal wire screening and spreading a thin layer of loose soil on top of said screening.

2. In combination, a strip of fine metal screening adapted to be laid as a mulch between rows of growing plants and means for shifting said strip longitudinally after it has been laid.

3. In combination, a strip of metal screening adapted to be laid as a mulch between rows of growing plants and lever means attached to the ends of said strip for shifting said strip longitudinally.

4. In combination, a strip of metal screening adapted to be laid as a mulch between rows of growing plants, rolls fastened to opposite ends of said strip and means for positioning said rolls with respect to the ground.

5. As a new article of manufacture, a mulching strip comprising metal wire screening of from 6" to 18" in width, the lateral edges of which are reinforced against unraveling of the screen mesh, and having a plurality of weights attached thereto at intervals throughout the length thereof.

6. As a new article of manufacture, a strip of mulching material having a plurality of weights attached thereto at intervals throughout the length thereof.

FREDERICK W. SPERR, Jr.